United States Patent [19]

Yamada et al.

[11] Patent Number: 4,764,004
[45] Date of Patent: Aug. 16, 1988

[54] AUTOMOBILE OUTER MIRROR ASSEMBLY

[75] Inventors: Takashi Yamada; Masaki Fujita; Toshikazu Ichino; Yoshio Tsujiuchi; Morihiko Ogasawara; Yoshihiro Kawai, all of Aichi, Japan

[73] Assignee: Kabushiki Kaisha Tokai Rika Denki Seisakusho, Aichi, Japan

[21] Appl. No.: 81,157

[22] Filed: Aug. 4, 1987

[30] Foreign Application Priority Data

Aug. 4, 1986 [JP] Japan ................................ 61-183916
Jun. 23, 1987 [JP] Japan ................................ 62-155797

[51] Int. Cl.$^4$ .......................... G02B 7/18; G02B 5/08; B60R 1/06; F16C 11/06
[52] U.S. Cl. .................................. 350/632; 248/483; 403/123; 403/90
[58] Field of Search ............... 350/632, 633, 634, 636; 248/483, 478, 481, 288.3; 403/123, 90, 129, 125, 144

[56] References Cited

U.S. PATENT DOCUMENTS 4,555,166 11/1985 Enomoto ............................. 350/634

FOREIGN PATENT DOCUMENTS 494386 8/1950 Belgium ............................. 248/483
2569637 3/1986 France ............................. 350/634
60-40367 4/1982 Japan .
WO83/01232 4/1983 PCT Int'l Appl. ................. 350/634

Primary Examiner—Jon W. Henry
Attorney, Agent, or Firm—Birch, Stewart, Kolasch & Birch

[57] ABSTRACT

A connection arrangement for a mirror back supporting plate and a mirror support member in a mirror case for an automobile outer mirror assembly comprises a connecting portion of the mirror back supporting plate being held between a connecting portion of the mirror support member and a clutch member and these members being connected to each other by a connecting member. The connecting member extends through a through-hole of the clutch member and also through a through-hole of the mirror back supporting plate. After being passed through the through-holes, the connecting member is rotated 90 degrees about its axis so that it is mounted to the mirror back supporting plate. Therefore, the mirror back supporting plate and the mirror supporting member can be easily connected together.

3 Claims, 3 Drawing Sheets

AUTOMOBILE OUTER MIRROR ASSEMBLY

BACKGROUND THE INVENTION

1. Field of the invention

The present invention relates to so-called outer mirrors, such as fender mirrors and door mirrors for automobiles. More particularly, the invention relates to improvements in a connection arrangement for a mirror back supporting plate for supporting a mirror body at the back thereof and a mirror support member fixed in a mirror case.

2. Prior art

As is well known, in automobile outer mirror assemblies of the above type, it is necessary that the mirror back supporting plate and the mirror body be rotatably mounted relative to the mirror support member in order that the angle of the mirror may be adjusted in upward, downward, and lateral directions.

A typical prior-art connection arrangement for the mirror back supporting plate and the mirror support member is shown in FIG. 7. Such a connection arrangement is disclosed in Japanese utility mode publication No. 40367/1985. The connection arrangement shown is such that a connecting portion 2a of a mirror back supporting plate 2 is rotatably connected to a connecting portion of a mirror support member 5 by means of a setscrew 4. This arrangement will be described in detail below.

In FIG. 7, numeral 2 is a mirror back support plate for supporting a mirror body 1 at the back thereof, and 5 is a mirror support member fixed in a mirror case (not shown). The mirror back support plate 2 has a protuberant connecting portion 2a of a semispherical shape located generally centrally thereof. The mirror support member 5 has a semispherical recess 5a engageable with the protuberant connecting portion 2a. The semispherical protuberant connecting portion 2a of the mirror back supporting plate 2 is fitted on its inner periphery side with a saucer-shaped clutch member 6 and a setscrew 4 is screwed into a central protuberance 5b of the mirror support member 5 from the inner periphery side of said semispherical protuberant connecting portion 2a. A coil spring 3 is fitted on the outer periphery of the setscrew 4 in the semispherical protuberant connecting portion 2a, said coil spring 3 being compressedly held between a head portion 4a of the setscrew 4 and the clutch member 6. Thus, the connecting portion 2a of the mirror back support plate 2 is held between the outer periphery of the clutch member 6 and the semispherical recess 5a of the mirror support member 5. Further, the presence of the coil spring 3 permits the connecting portion 2a to be resiliently held in position. Therefore, by tilting the mirror back support plate together with the mirror body 1 in any desired direction with respect to the mirror supporting member 5, either by hand or by electric drive means, the connecting portion 2a of the mirror back support plate 2 can be caused to slide smoothly relative to the semispherical recess 5a of the mirror support member 5.

With the above described arrangement, however, the trouble is that screwing operation with the setscrew 4 is required when the mirror back support plate 2 on which the mirror body 1 is supported is mounted to the mirror support member 5, which means laborious and time consuming work.

SUMMARY OF THE INVENTION

The present invention is intended to solve the aforesaid problem, and accordingly the invention has as its object the provision of an automobile outer mirror assembly which includes spring means as in the conventional arrangement and yet permits easy mounting of a mirror back supporting plate to a mirror support member.

In order to accomplish the foregoing object, according to the present invention, a connecting member of a special construction in place of the setscrew is used in the prior-art arrangement. The invention presents an automobile outer mirror assembly having a protuberant connecting portion generally centrally located in a mirror back supporting plate which supports a mirror body at the back side thereof, the protuberant connecting portion being rotatably connected through connecting means to a connecting portion of a mirror support member fixed in position in a mirror case, comprising said protuberant connecting portion having a through-hole in the center portion thereof, and also having a semispherical outer periphery and a semispherical inner periphery. The said connecting portion projects from a body portion of said mirror support member and has on the opposite side of said mirror back supporting plate a semispherical inner periphery for contact with the semispherical outer periphery of said protuberant connecting portion. A through-hole opening is provided at the center of said inner periphery to communicate with the through-hole of said protuberant connecting portion and extends through said mirror support member. The connecting means consists of a clutch member, a connecting member, and spring means, said clutch member having a semispherical outer periphery slidably engageable with the semispherical inner periphery of said mirror back supporting plate, and a bottom portion extending through the through-hole of said protuberant connecting portion and engageable with said mirror support member rotatably about the axis of said through-hole and not about the center of the semispherical inner periphery of said connecting member. The bottom portion has a through-hole with communicates with the through-hole of said mirror support member, said connecting member having a connecting rod extending through the through-hole of the clutch member and through the through-hole of the mirror support member, and a protuberance projecting radially from one end of said connecting rod and adapted to pass through said through-holes, said protuberance being rotatable about the axis of the connecting rod for phase variation so that it is unreleasably locked around the rear side of the through-hole of the mirror back support member. The spring means is compressedly fitted between said clutch member and the other end of said connecting rod so as to press the clutch member against said mirror support member while pressing said protuberance of said connecting rod against the circumferential edge portion of the through-hole of said mirror support member, so that the connecting portion of said mirror back supporting plate and the connecting portion of said mirror support member are connected to each other by said connecting member so that said connecting portion of the mirror back supporting plate is rotatably held between the inner periphery of said connecting of the mirror support member and the semispherical outer periphery of said clutch member.

In the outer mirror assembly of the foregoing arrangement, the connecting portion of the mirror back supporting plate is movable between the semispherical inner periphery connecting portion of the mirror support member and the semispherical outer periphery of the clutch member by vertically or laterally tilting the mirror back supporting plate in conjunction with the mirror body. In other words, the connecting member and the clutch member are held stationary in position so that the connecting portion of the mirror back supporting plate is resiliently held between them under the biasing force of the spring means.

According to the foregoing arrangement, the connecting portion of the mirror back supporting plate is positioned on the connecting portion of the mirror support member fixed in position in the mirror case. The bottom of the clutch member is passed through the through-hole of the mirror back supporting plate and the clutch member is fitted into the connecting portion of the mirror back supporting plate. The connecting member fitted with spring means is then passed through the respective through-holes of the clutch member and the mirror support member and then the connecting member is rotated about the axis thereof for changing the phase of its protuberance relative to the through-hole of the mirror support member. Thereafter, the said protuberance is locked on a back face of the mirror supporting member around the through-hole under the biasing force of the spring means. If the mirror body is fitted on the mirror back supporting plate, the mirror body can be readily and accurately mounted to the mirror support member in the mirror case under the biasing force of the spring means. If the connecting member is rotated about its axis a specified angle to bring the phase of the protuberance into agreement with that of the through-hole, these members can be readily separated from one another.

Thus, the technical task of the invention can be accomplished by the above described arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects and features of the present invention will become apparent from the following description taken in conjunction with the preferred embodiment thereof, with reference to the accompanying drawings which are given by way of illustration only, and thus, are not limitative of the present invention and, in which.

DETAILED DESCRIPTION OF THE INVENTION

Figure 1:
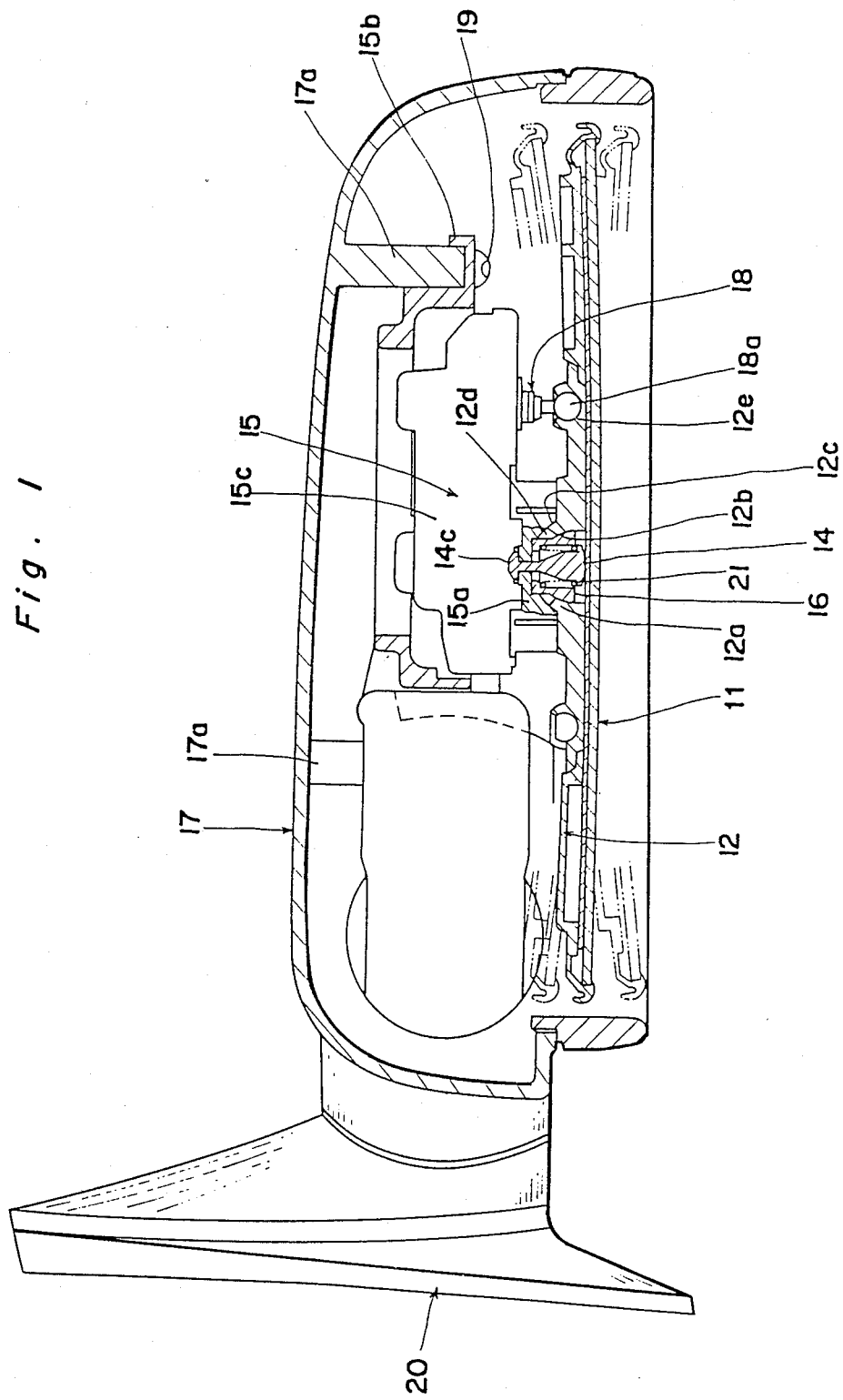
FIG. 1 is a horizontal sectional view of a door mirror assembly according to a first embodiment of the present invention.
Figure 2:
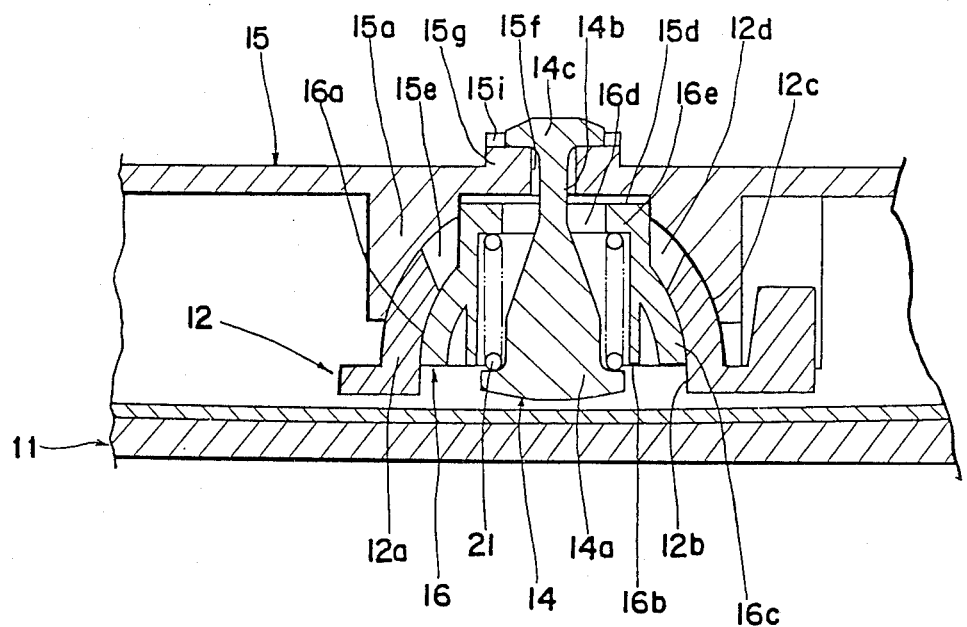
FIG. 2 is a horizontal enlarged sectional view of essential portions showing a connection arrangement for a mirror back supporting plate and a mirror support member.

Before the description of the present invention proceeds, it is to be noted that like parts are designated by like reference numerals and symbols throughout the several views of the accompanying drawings.

A first embodiment of the invention will now be described in detail with reference to FIGS. 1-4. It is noted that the embodiment represents a door mirror assembly of the type that a mirror back supporting plate, in conjunction with a mirror body 11, is tilted vertically and laterally by an electric power drive.

In the figures, numeral 20 designates a stay to be fixed to a door (not shown), and numeral 17 designates a mirror case rotatably fixed or mounted to the stay 20. In the mirror case 17, a mirror drive unit case 15 or a mirror support member is fixed in a position in which a drive unit is housed for vertically and laterally tilting the mirror body 11 in conjunction with the mirror back supporting plate 12. A connecting portion 12a of the mirror back supporting plate 12 is vertically and laterally rotatably connected to a connecting portion 15a located at the front end of the mirror drive unit case 15. The mirror body 11 is supported at the back thereof by the mirror back supporting plate 12 as is the case with the prior art arrangement. The connecting portion 12a is protuberant at a generally central location on the mirror back supporting plate 12 and has a through-hole 12d in its center. The outer periphery 12c and the inner periphery 12b of the connecting portion 12a are both semispherically configured.

Figure 3:
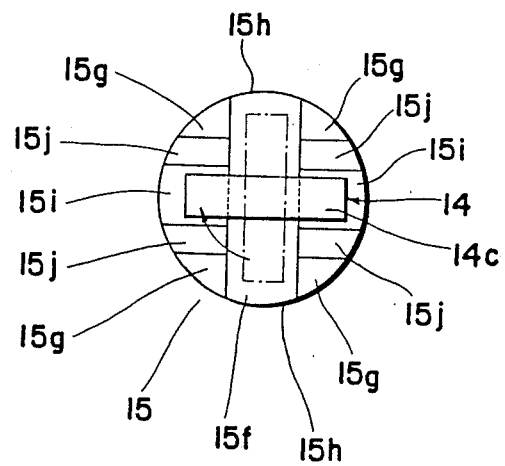
FIG. 3 is an enlarged rear view showing a protuberant portion of a mirror drive unit case.
Figure 4:
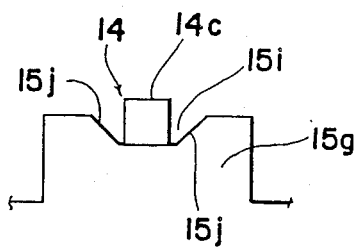
FIG. 4 is an enlarged side view of the protuberant portion.

The mirror drive unit case 15, being made of a synthetic resin, comprises a body portion 15c in which the mirror drive unit is housed, and said connecting portion 15a projecting from the front face of the body portion 15c, both of said portions being integrally constructed. The connecting portion 15a projects forwardly of the body portion 15c of the mirror drive unit case 15 and has a semispherical inner periphery 15e in the interior thereof. At the bottom of the semispherical inner periphery 15e a circular recess 15d for receiving the bottom 16e of a clutch member 16 is formed. In the center of the recess 15d, as FIGS. 2 and 3 indicate, there is formed a through-hole 15f extending through the mirror drive unit case 15, said through-hole 15f having a generally rectangular sectional configuration. At the rear end of the mirror drive unit case 15, that is, opposite to said connecting portion 15a, as FIGS. 3 and 4 show, there is formed a protuberance 15g having a pair of notches 15h, 15h communicating with the through-hole 15f. The protuberance 15g also has recesses 15i formed on a back face of the protuberance 15g at positions angularly different by 90° from the individual notches 15h relative to the axis of the through-hole 15f. Side walls of each recess 15i are slanted as shown by 15j for ease of fitting-in, locking, and unlocking of a second flange portion 14c of a connecting member 14 which will be described hereinafter.

The connecting portion 15a of the mirror drive unit case 15 and the connecting portion 12a of the mirror back supporting plate 12 are connected to each other by connecting means 14, 16, 21. The connecting means comprises a connecting member 14 for connecting the connecting portion 12a of the mirror back supporting plate 12 directly with the connecting portion 15a of the mirror support member 15, a clutch member 16 housed in the connecting portion 12a, and spring means or more specifically a coil spring 21 housed in the clutch member 16.

The clutch member 16 includes a cylindrical portion 16b and a semispherical portion 16c integrally formed therewith on the outer periphery of the cylindrical portion 16b at one end thereof, the outer periphery 16a of said semispherical portion 16c having a generally semispherically configured. This outer periphery 16a is slidably engageable with the semispherical inner periphery 12b of the connecting portion 12a of said mirror back supporting plate 12. Its bottom portion 16e is adapted to be fitted in the recess 15d formed in the inner periphery 15e of the connecting portion 15a of said mirror drive unit case 15 so that the clutch member 16 is prevented from rotation along the inner periphery 15e.

The connecting member 14 is of a flat configuration and comprises a connecting neck 14b which is gradually reduced in diameter from its one end columnar portion toward the other end thereof and which, at the other end side, is rectangularly shaped in its section perpendicular to the axis thereof, a flange portion 14a connected to said one end columnar portion and projecting radially, and a flange portion 14c in the form of a protuberance connected to said other end portion of a rectangular sectional configuration and projecting radially. As can be seen from FIG. 2, the flange portion 14a is movable into and from the cylindrical portion 16b of the clutch member 16, and a larger part of the connecting neck 14b is housed in said cylindrical portion 16b. The sectionally rectangular portion of the connecting rod 14b projects from the clutch member 16, extending through the through-holes 16d of the bottom portion 16e of the clutch member 16 and through the through-hole 15f of the mirror drive unit case 15. The flange portion 14c passes through said through-holes 16d, 15f and further through the notches 15h, 15h of the protuberance 15g. The connecting member 14 is rotated 90 degrees about its axis so that the flange portion 14c is fitted into the pair of recesses 15i, 15i and locked, and the clutch member 16, the mirror back supporting plate 12, and the mirror drive unit case 15 are integrally connected together by the connecting member 14, while the connecting portion 12a of the mirror back supporting plate 12 is slidably held between the outer periphery 16a of the clutch member 16 and the inner periphery 15e of the connecting portion 15a of said mirror drive unit case 15.

The coil spring 21 is housed in the cylindrical body 16b of the clutch member 16 and thus fitted on the outer periphery of the connecting rod 14b of the connecting member 14. One end of said coil spring 21 is pressed against the flange portion 14a while the other end thereof is pressed against the bottom of the cylindrical portion 16b of said clutch member 16. Therefore, when the flange portion 14c of the connecting member 14 is locked in the recesses 15i, 15i of the protuberance 15g of said mirror drive unit case 15, the clutch member 16 is pressed against the mirror drive unit case 15 by the coil spring 21 through the connecting portion 12a of the mirror back supporting plate 12, so that the clutch member 16 and the connecting portion 12a of the mirror back supporting plate 12 are fitted into the connecting portion 15a of the mirror drive unit case 15. In other words, the semispherical outer periphery 16a of the clutch member 16 is brought into close contact with the semispherical inner periphery 12b of the connecting portion 12a of said mirror back supporting plate 12.

In addition, the mirror drive unit case 15 has at its sides a pair of flanges 15b, each of which is fixed through a set screw 19 to a support leg 17a formed in the mirror case 17. In the drawings, numeral 18 designates a mirror push-pull shaft projectable from the interior of the mirror drive unit case 15 for laterally tilting the mirror back supporting plate 12 in conjunction with the mirror body 11. The push-pull shaft 18 has a spherical end portion 18a rotatably connected to a bearing portion 12e provided in position on the mirror back supporting plate 12.

For the purpose of assembling the mirror assembly according to the above described embodiment, the connecting portion 12a of the mirror back supporting plate 12 is first fitted in the connecting portion 15a of the mirror drive unit case 15. The clutch member 16 is then fitted in the connecting portion 12a of the mirror back supporting plate 12 so that it is passed through the through-hole 12d of said connecting portion 12a, and the bottom portion 16e of the clutch member 16 is fitted in the recess 15d of the inner periphery 15e of said connecting portion 15a. Then, the coil spring 21 is fitted on the connecting rod 14b through the flange portion 14c of the connecting member 14. Thereafter, the flange portion 14c of the connecting member 14 is fitted into the cylindrical body 16b of the clutch member 16 so that it is passed through the through-hole 16d at the bottom of said cylindrical body and then passed through the through-hole 12d of the mirror back supporting plate 12 and through the through-hole 15f of the mirror drive unit case 15 and further through the notches 15h, 15h against the biasing force of the coil spring 21. Subsequently, the connecting member 14 is rotated 90 degrees about its axis and then it is released from manual control, whereupon the first flange portion 14c of the connecting member 14 is fitted in the recesses 15i, 15i of the protuberance 15g and locked in position under the biasing force of the coil spring 21. The mirror body 11 is then fitted on the mirror back supporting plate 12.

The mirror assembly thus assembled operates in such a manner that as the mirror back supporting plate 12 is rotated in conjunction with the mirror body 11, the connecting portion 12a of said supporting plate 12 goes into smooth rotation while being resiliently compressed by and between the outer periphery 16a of the clutch member 16 and the inner periphery 15e of the connecting portion 15a. In this case, the connecting member 14 and the clutch member 16 have no movement. That is, the bottom portion 16e of the clutch member 16 is fitted in the recess 15d of the inner periphery 15e of said connecting portion 15a so that the clutch member 16 is prevented from being rotated relative to the mirror drive unit case 16 and so that the connecting portion 12a of the mirror back supporting plate 12 is allowed to freely slide between the clutch member 16 and the mirror drive unit case 15.

According to the above described arrangement, the connecting portion 12a of the mirror back supporting plate 12 is positioned on the connecting portion 15a of the mirror drive unit case 15 fixed in position in the mirror case 17 and then the connecting member 14 on which the coil spring 21 is fitted is passed through these members 16, 12, 15. Thereafter, the connecting member 14 is rotated 90 degrees, about its axis and locked to the mirror support member 15. Subsequently, the mirror body 11 is fitted on the mirror back supporting plate 12. In this way, the mirror body 11 can be easily and accurately mounted in the mirror case 17 under the biasing force of the coil spring 21. If the connecting member 14 is rotated 90 degrees about its axis, these members can be easily separated from one another.

The flange portion 14c of the connecting member 14 may be cross-shaped or otherwise configured as desired.

Figure 5:
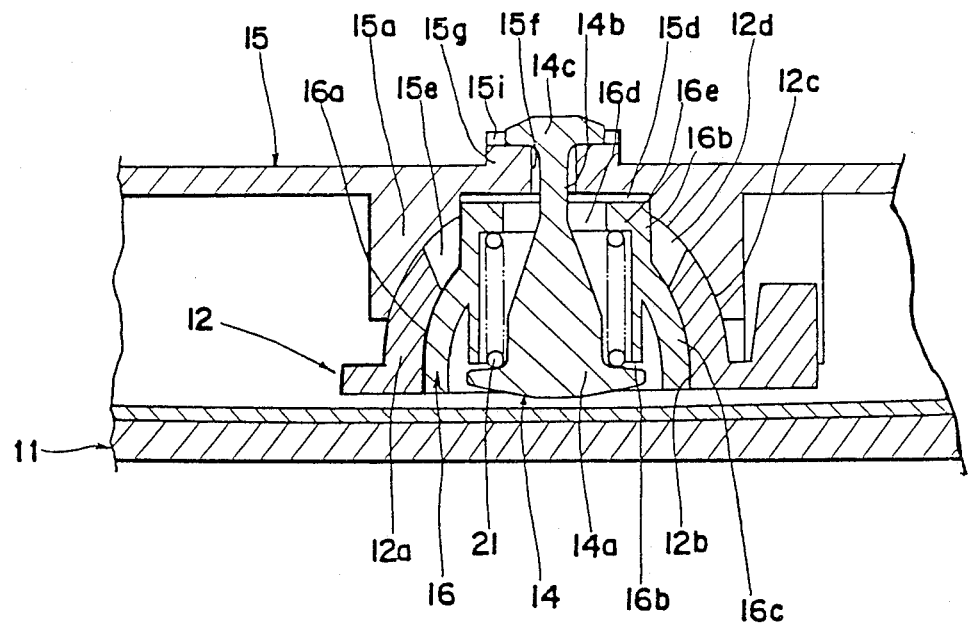
FIG. 5 is a horizontal enlarged sectional view similar to FIG. 2, showing a door mirror assembly according to a second embodiment of the invention.
Figure 6:
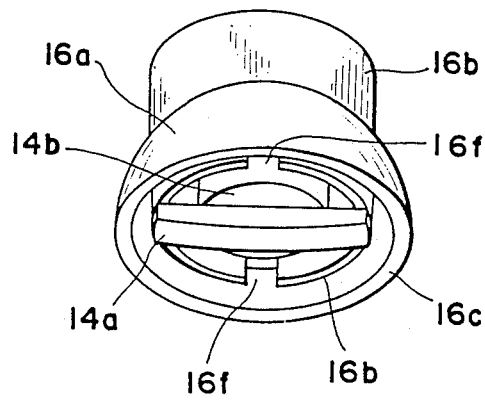
FIG. 6 is a perspective view showing a clutch member and a connecting member in assembled condition.
Figure 7:
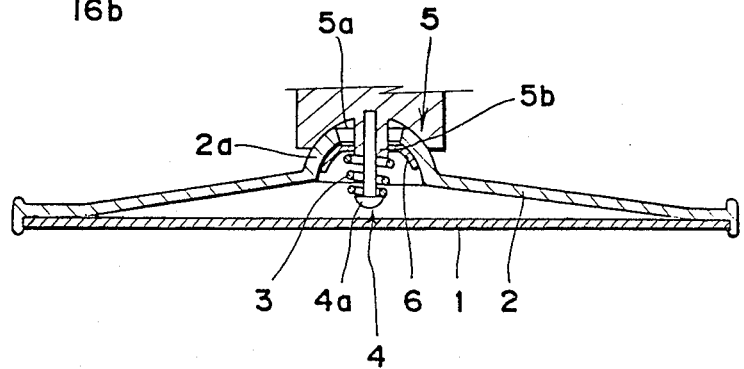
FIG. 7 is a horizontal sectional view showing a conventional mirror assembly, as previously described.

FIGS. 5 and 6 show a second embodiment of the invention. This embodiment is different from the first embodiment in that the front end side flange portion 14a of the connecting member extends longer and in that notches 16f are provided at the front end of the cylindrical portion 16b of the clutch member 16 on two radially opposite sides.

The flange portion 14a is movable into and away from the notches 16f formed on the front end of the cylindrical portion 16b of the clutch member 16. When the flange portion 14c of the connecting member 14 is fitted into the through-hole 15f, the flange portion 14a is housed in the grooves 16f, thereby permitting the flange portion 14c to surmount the height of the protuberance 15g. The flange portion 14c is fitted in the pair of recesses 15i, 15i and locked in position by rotating the connecting rod 14b 90 degrees about its axis. In this case, the clutch member 16 rotates 90 degreesin conjunction with the connecting member 14 on account of the engagement of the flange portion 14a with the slits 16f. As the flange portion 14c is fitted in the recesses 15i, the connecting member 14 itself is moved forward under the biasing force of the coil spring 21 and, therefore, the flange portion 14a is moved out of the slits 16f. Thus, the clutch member 16 is now rotatable about the axis of its cylindrical portion 16b, and as FIG. 5 shows, the clutch member 16 is rotated with respect to the other members so that the slits 16f and the flange portion 14a are respectively located at such positions which they are not opposed. In this way, the clutch member 16, the mirror back supporting plate 12, and the mirror drive unit case 15 are integrally connected together so that the protuberant connecting portion 12a of the mirror back supporting plate 12 is slidably held between the semispherical outer periphery 16a of the clutch member 16 and the semispherical inner periphery 15e of the connecting portion 15a of said mirror drive unit case 15. According to the first embodiment, when the mirror back supporting plate 12 is pushed by the mirror push-pull shaft during a mirror tilting operation, the clutch member 16 may endeavor to lift from the mirror supporting member 15 as if it is pushed forward. However, according to this second embodiment, the front end of the cylindrical body 16b of the clutch member 16 goes into abutment with the first flange portion 14a so that such lifting is prevented.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. An automobile outer mirror assembly comprising:
   a proturberant connnecting portion being generally centrally located in a mirror back supporting plate which supports a mirror body at a back side thereof, said protuberant connecting portion having a through-hole in a center portion thereof, and also having a semispherical outer periphery and a semispherical inner periphery; and
   connecting means for rotatably connecting the protuberant connecting portion to a connecting portion of a mirror support member fixed in position in a mirror case, said connecting portion of the mirror support member projecting from a body portion of said mirror support member and having on an opposite side of said mirror back supporting plate a semispherical inner periphery for contact with the semispherical outer periphery of said protuberant connecting portion of said mirror back supporting plate, a through-hole opening at a center of said inner periphery to communicate with the through-hole of said protuberant connecting portion and extending through said mirror support member, said connecting means further comprising,
   a clutch member having a semispherical outer periphery slidably engageable with the semispherical inner periphery of said mirror back support plate, and a bottom portion extending through the through-hole of said protuberant connecting portion and engageable with said mirror support member rotatably about the axis of said through-hole but not about the center of the semispherical inner periphery of said member, said bottom portion having a through-hole which communicates with the through-hole of said mirror support member,
   a connecting member having a connecting neck extending through the through-hole of the clutch member and through the through-hole of the mirror support member, and a first flange portion projecting radially from a first end of said connecting rod and adaptd to pass through said through-holes, said flange portion being rotatable about the axis of the connecting member for phase variation so that it is unreleasably locked around a rear face of the mirror back support member, and
   a spring means being compressedly fitted between said clutch member and a second end of said connecting neck so as to press the clutch member against said mirror support member while pressing said first flange portion of said connecting member against a circumferential edge portion of the through-hole of said mirror support member, whereby the connecting portion of said mirror back supporting plate and the connecting portion of said mirror support member are connected to each other by said connecting member for rotatably holding said connecting portion between the inner periphery of said connecting portion and the semispherical outer periphery of said clutch member.

2. The automobile outer mirror assembly as claimed in claim 4, wherein recesses are provided around the rear face of said mirror back support member for receiving the first flange of said connecting member.

3. The automobile outer mirror assembly as claimed in claim 2, wherein said clutch member is formed at the front end thereof with slits located at radially opposite sides and the connecting neck of said connecting member has at the front end thereof a second flange portion which extends in radial directions, whereby when the connecting member is so held that it extends through the through-hole of the clutch member and through the through-hole of the mirror back support member, with said second flange portion fitted in said slits of the clutch member, the connecting member is rotated, in conjunction with the clutch member, a specified angle about the axis thereof so that the first flange portion is fitted in the slits of the mirror back support member while the second flange portion is released from the slits of the clutch member, whereafter the clutch member only is rotated a specified angle about its axis so that the second flange portion is locked to the front end of the clutch member.

* * * * *